US005625582A

United States Patent [19]
Timko

[11] Patent Number: 5,625,582
[45] Date of Patent: Apr. 29, 1997

[54] APPARATUS AND METHOD FOR OPTIMIZING ADDRESS CALCULATIONS

[75] Inventor: Mark A. Timko, Portland, Oreg.

[73] Assignee: Intel Corporation, Santa Clara, Calif.

[21] Appl. No.: 409,502

[22] Filed: Mar. 23, 1995

[51] Int. Cl.$^6$ ................................................ G06F 7/52
[52] U.S. Cl. .................................... 364/786; 364/749
[58] Field of Search ................................ 364/786, 768, 364/749

[56] References Cited

U.S. PATENT DOCUMENTS

| 3,299,261 | 1/1967 | Steigerwalt, Jr. | 364/786 |
|---|---|---|---|
| 3,515,344 | 6/1970 | Goldschmidt et al. | 364/786 |
| 5,418,736 | 5/1995 | Widigen et al. | 364/786 |
| 5,517,440 | 5/1996 | Widigen et al. | 364/786 |
| 5,522,085 | 5/1996 | Harrison et al. | 364/768 |

OTHER PUBLICATIONS

"The Metaflow Architecture" by Val Popescu, et al. *IEEE Micro* (Jun. 1991) pp. 10–13, 63–73.

*Primary Examiner*—David H. Malzahn
*Attorney, Agent, or Firm*—Blakely, Sokoloff, Taylor & Zafman

[57] ABSTRACT

An integrated circuit device performing arithmetic operations on a plurality of digital inputs to produce an effective address and a linear address in a single operation. The integrated circuit device comprises a first circuit, a first adder circuit and a second adder circuit. The first circuit performs logical operations on the plurality of digital inputs to produce a first group of output signals and a second group of output signals. The first adder circuit, coupled to the first circuit, performs a first set of arithmetic operations on the first group of output signals to produce an effective address. Concurrently, the second adder circuit, coupled to the first circuit and in parallel with the second adder circuit, performs a second set of arithmetic operations on the second group of output signals to produce a linear address.

31 Claims, 6 Drawing Sheets

APPARATUS AND METHOD FOR OPTIMIZING ADDRESS CALCULATIONS

BACKGROUND OF THE INVENTION

1. Field of the Invention

The present invention relates to the field of digital computation circuits. More particularly, the present invention relates to an architecture for integrated circuit logic elements performing arithmetic operations.

2. Description of the Prior Art

It is fundamental to the operations of many electronic systems as well as processors to support digital (i.e., binary) addition of at least two digital inputs. For example, processors normally employ integrated circuits which perform various arithmetic or logical ("bitwise") operations on multiple digital inputs in order to produce digital sums and other logical functions. These integrated circuits may include an address generation unit ("AGU") for performing memory loads and data storage; a branch address calculator ("BAC") for calculating appropriate branch instructions and the like.

Figure 1:
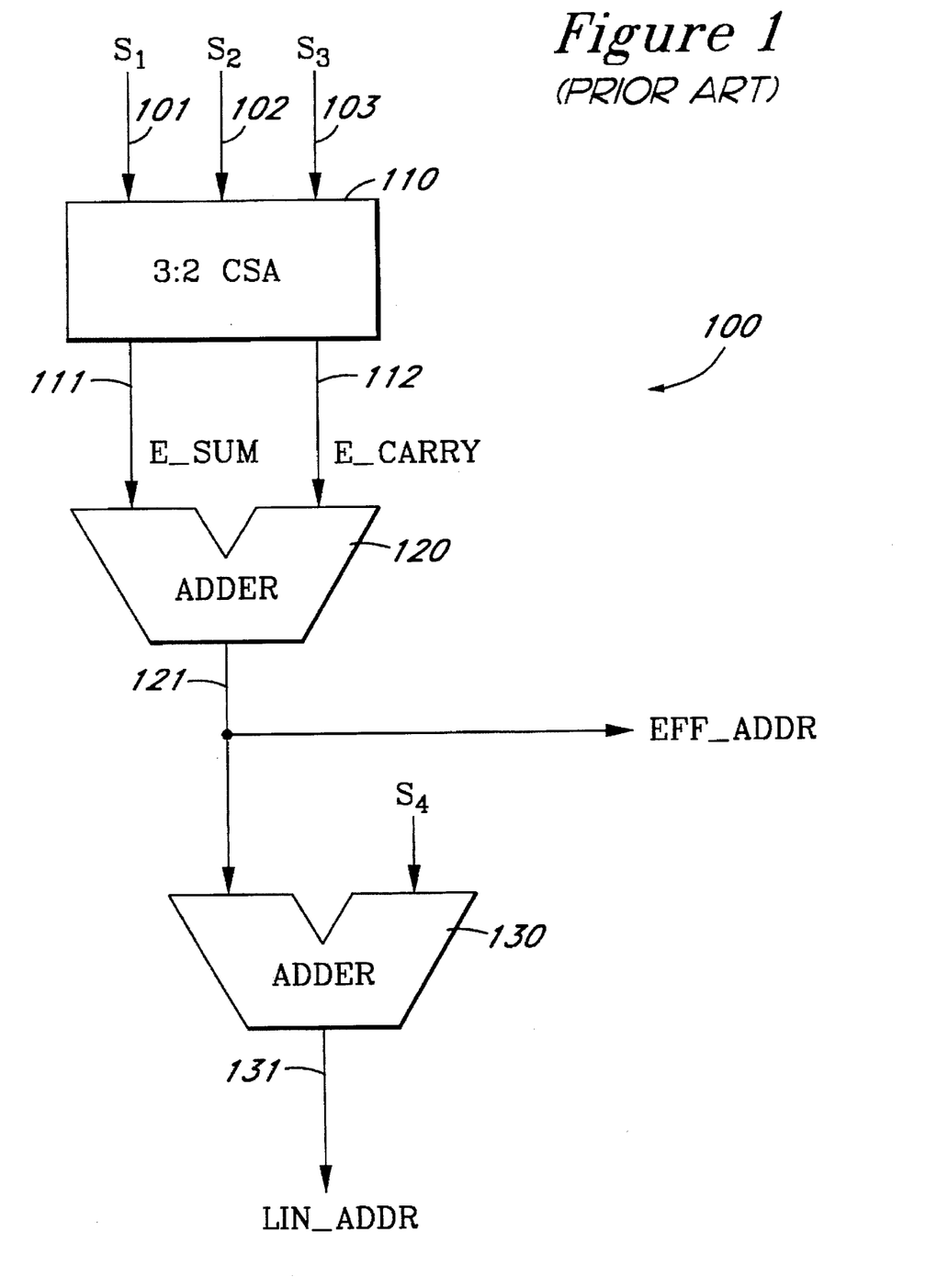
FIG. 1 illustrates a conventional integrated circuit utilizing a 3:2 CSA in combination with conventional adders in order to produce an effective address and a linear address.

Referring to FIG. 1, in conventional x86 Intel® Microprocessor Architecture, the AGU employs integrated logic to produce an effective address ("EFF_ADDR") and a linear address ("LIN_ADDR"), both of which have an arbitrary bit length "n" and are well known in the art. This logic is referred to as a "generation unit" 100 which includes a well known digital adder such as a carry-save-adder ("CSA") 110, operating in series with conventional adders 120 and 130. The effective and linear addresses may be calculated by "adding" digital inputs by using a combination of CSAs and carry propagate adders in parallel. These digital inputs are referred to as a base address ("S1"), an index multiplied by any scaling factor ("S2"), a displacement ("S3") and a segment base ("S4") according to the following equations:

$$EFF\_ADDR = S1 + S2 + S3; \text{ and} \qquad \text{Eqn. 1}$$

$$LIN\_ADDR = S4 + EFF\_ADDR, \text{ where} \qquad \text{Eqn. 2}$$

"+" is an operator representing a normal arithmetic addition.

As shown in FIG. 1, the CSA 110 receives three digital inputs in parallel, identified above for convenience as "S1", "S2" and "S3", via communication lines 101, 102 and 103, respectively. Usually, these digital inputs "S1–S3" are 32-bit double words, but it is contemplated that they may be of any arbitrary bitwidth. After transferring digital inputs "S1–S3" into the CSA 110, the CSA 110 sums these digital inputs to produce a number of sum ("E_SUM") signals via communication lines 111 and carry ("E_CARRY") signals through communication lines 112. These E_SUM and E_CARRY signals are calculated by performing logical operations on corresponding bits of the digital inputs and may be represented through the following logical representations where "i" is an arbitrary bit number:

$$E\_SUM_i = S1_i \text{ XOR } S2_i \text{ XOR } S3_i;$$

and $$E\_CARRY_{i+1} = (S1_i \text{ XNOR } S2_i) \text{ \&\& } S1_i \text{ || } (S1_i \text{ XOR } S2_i) \text{ \&\& } S3_i,$$

where:

"||" is a bitwise logical OR,

"&&" is a bitwise logical AND, and

"XOR", "XNOR" are well known digital operations.

These E_SUM and E_CARRY signals, propagating through the communication lines 111 and 112, are input into a first conventional adder 120 to produce the effective address "EFF_ADDR" via communication lines 121. The EFF_ADDR propagates through the communication lines 121 to various components of the processor and is input into the second conventional adder 130 in combination with digital input "S4" propagating through communication lines 122. The EFF_ADDR, in combination with the digital input "S4", produce the linear address "LIN_ADDR" as defined above. The LIN_ADDR propagates through communication lines 131 for use by the processor. However, as operational speed of the processor increases, this conventional architecture for calculating EFF_ADDR and LIN_ADDR has a number of disadvantages.

One disadvantage is that this architecture experiences a large amount of latency in producing both the effective and linear addresses due to its serial configuration. For processors requiring minimal latency and higher operating speeds, serial calculation of the linear addresses is not a viable option.

Another disadvantage is that extra loading is placed on the communication lines 121 providing the EFF_ADDR since EFF_ADDR is used in both the LIN_ADDR addition and in other logical functions.

Thus, it would be advantageous to implement an integrated circuit producing both the effective address and the linear address in parallel which overcomes both of the above-identified disadvantages.

BRIEF SUMMARY OF THE INVENTION

The present invention relates to an integrated circuit device performing arithmetic operations on a plurality of digital inputs including, but not limited to a base address, scaled index, displacement and a segment base. The integrated circuit device comprises a first circuit for performing logical operations on the plurality of digital inputs to produce a first group of output signals and a second group of output signals. Coupled to the first circuit, a first adder circuit performs a first set of arithmetic operations on the first group of output signals in order to produce an effective address. A second adder circuit, further coupled to the first circuit and in parallel with the first adder circuit, performs a second set of arithmetic operations on the second group of output signals in order to produce a linear address.

BRIEF DESCRIPTION OF THE DRAWINGS

The features and advantages of the present invention will become apparent from the following detailed description of the present invention in which.

DETAILED DESCRIPTION OF THE INVENTION

Various embodiments of a combined carry-save adder ("CSA") used to produce an effective and linear addresses in parallel are described below. In the following description, for purposes of explanation, specific details are set forth in order to provide a thorough understanding of the present invention. However, it is apparent to one skilled in the art of circuit design that the present invention may be practiced in any integrated circuit, especially processors, without these specific details. In other instances, well known operations, functions and devices are not shown in order to avoid obscuring the present invention.

In the detailed description, a number of terms are frequently used to describe certain logic circuits and define certain representations herein. For example, a "bit slice" is defined as all logic within a CSA which produces digital signals associated with a particular bit (e.g., signals $E\_SUM_i$, $E\_CARRY_{i+1}$, $L\_SUM_i$ and $L\_CARRY_{i+1}$, for an $i^{th}$ bit slice). An "adder" is defined as any logic performing arithmetic operations on two inputs to produce an "added" result such as a carry propagate adder, carry ripple adder, carry look ahead adder and the like. Also, the representation "x:y" indicates that a digital device (e.g., adder) has "x" inputs and "y" outputs. In fact, some portions of the detailed description which follow are presented in terms of logical representations of logical operations which are used by those skilled in the art to effectively convey the substance of their work to others skilled in the art. These logical representations require physical manipulation of various electrical or magnetic signals capable of being stored, transferred, combined, compared or otherwise manipulated.

Figure 2:
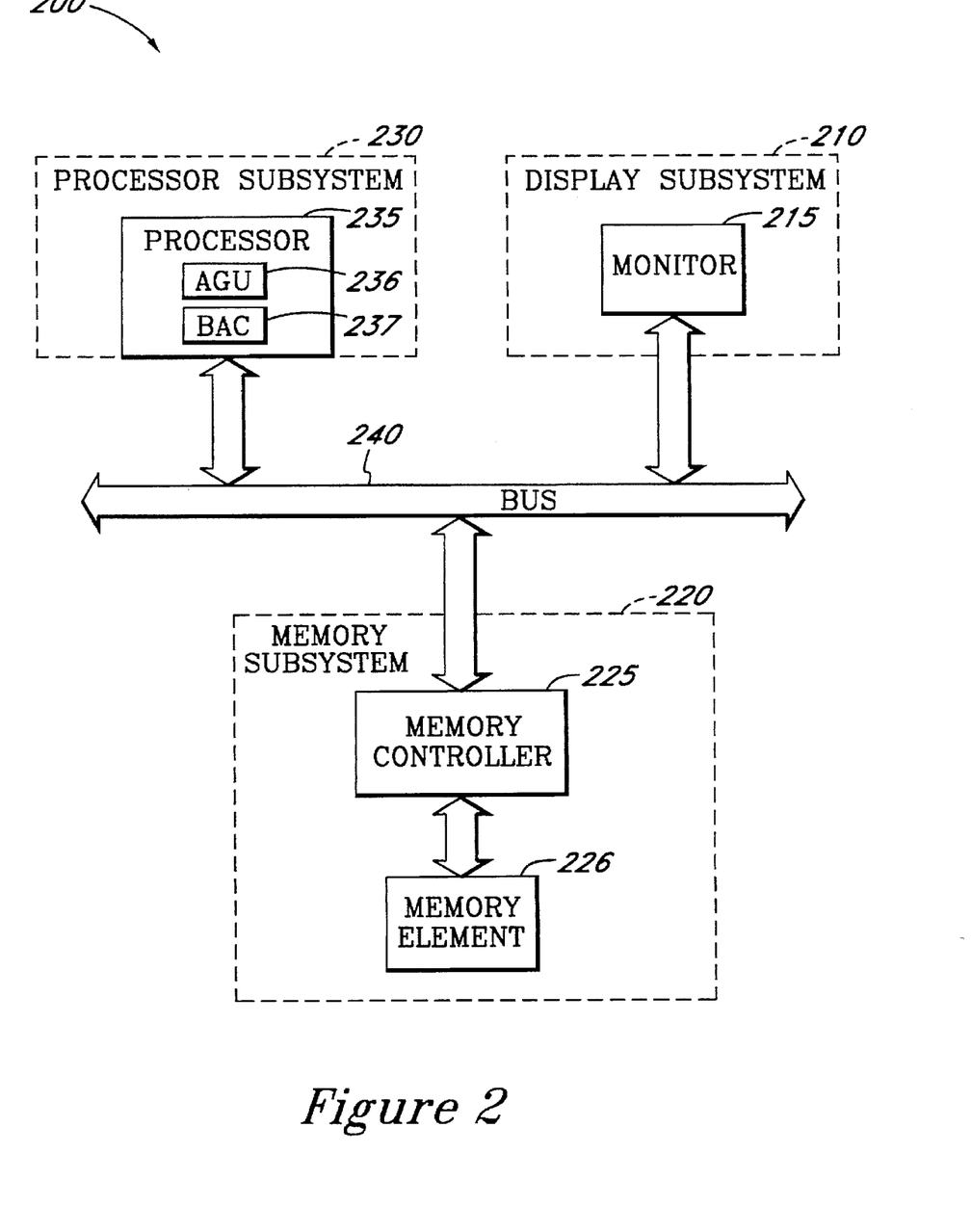
FIG. 2 is an illustrative embodiment of a computer system employing the present invention.

Referring to FIG. 2, an embodiment of a computer system 200 employing the present invention is illustrated. The computer system 200 comprises a display subsystem 210, a memory subsystem 220 and a processor subsystem 230, all of which being coupled together by a bus 240 including address, data and control lines. The display subsystem 210 enables information to be displayed on a monitor 215 such as a cathode ray tube, flat panel display or any other monitor device.

The memory subsystem 220 includes a memory controller 225 providing an interface for controlling access to at least one memory element 226 such as dynamic random access memory ("DRAM"), read only memory ("ROM"), video random access memory ("VRAM") and the like. The memory element 226 stores information for use by the processor subsystem 230.

The processor subsystem 230 includes at least one processor 235, preferably but not limited to a reduced instruction set ("RISC") processor. The processor 235 employs integrated circuits, including but not limited to an address generation unit ("AGU") 236 and a branch address calculator ("BAC") 237 dedicated to performing addressing and branching operations, respectively. At least one generation unit (not shown) within the AGU 236 and the BAC 237 is used to calculate effective and linear addresses needed by the processor.

Figure 3:
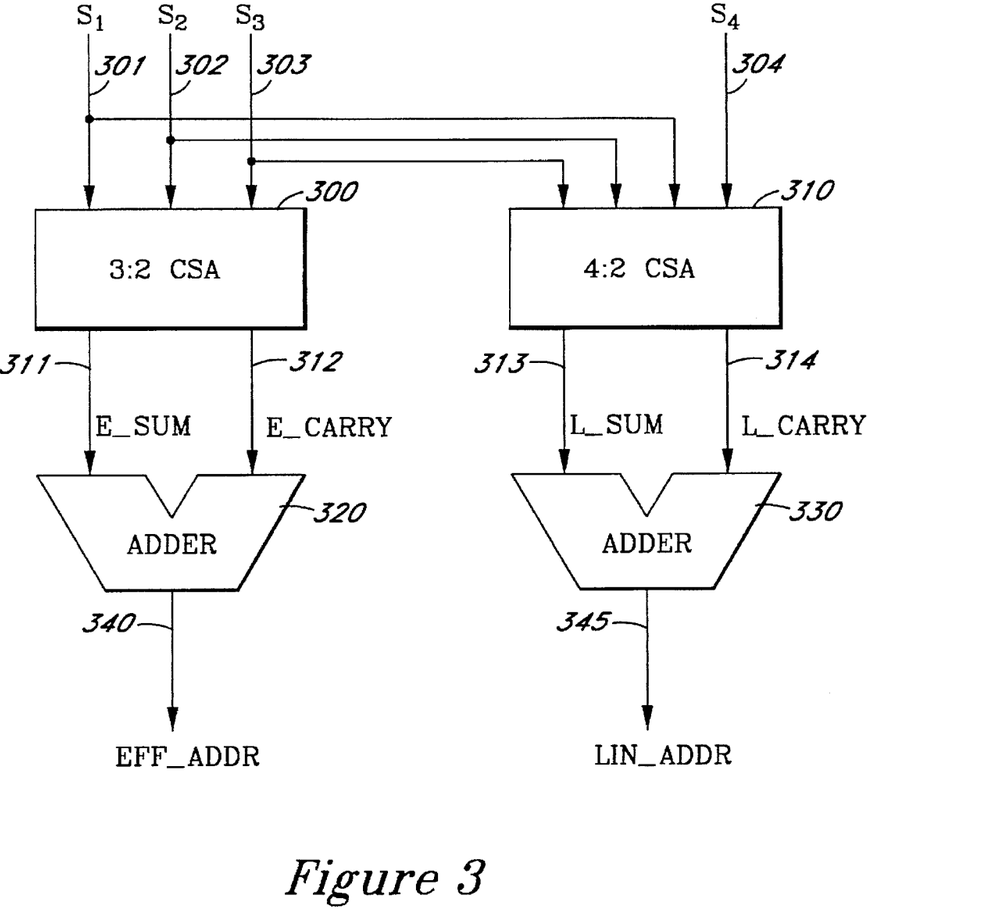
FIG. 3 is an illustrative embodiment of an independent 3:2 CSA and a 4:2 CSA operating in parallel in order to produce an effective address and a linear address.

Referring now to FIG. 3, a first embodiment of the generation unit is a 3:2 CSA 300 and a 4:2 CSA 310 implemented in parallel to simultaneously perform calculations on the base address ("S1"), the "scaled" index ("S2"), the displacement ("S3") and the segment base ("S4") to produce the effective address and the linear address. More specifically, digital inputs S1, S2 and S3 propagating through communication lines 301–303 are transferred in parallel into both the 3:2 CSA 300 and the 4:2 CSA 310. In addition, the digital input "S4", propagating through communication lines 304, is input exclusively into the 4:2 CSA 310.

With respect to the operations of the 3:2 CSA 300, each bit slice of the 3:2 CSA 300 produces a bitwise sum "$E\_SUM_i$" signal and an appropriate carry "$E\_CARRY_{i+1}$" signal based on its digital inputs "S1–S3" as represented by the following equations where "i" again represents an arbitrary bit number:

$E\_SUM_i = S1_i$ XOR $S2_i$ XOR $S3_i$; and  Eqn. 3

$E\_CARRY_{i+1} = (S1_i$ XNOR $S2_i)$ && $S1_i$ || $(S1_i$ XOR $S2_i)$ && $S3_i$,  Eqn. 4 where:

"||" is a bitwise logical OR,

"&&" is a bitwise logical AND, and

"XOR", "XNOR" are well-known logical operations.

All of the E_SUM and E_CARRY signals propagate through communication lines 311 and 312 are input into a conventional first adder 320 which produces the effective address "EFF_ADDR" propagating through communication lines 340.

In parallel with the operations of the 3:2 CSA 300, the 4:2 CSA 310 produces a bitwise sum "$L\_SUM_i$" and corresponding carry "$L\_CARRY_{i+1}$" signals in accordance with the following logical representations:

$L\_SUM_i = S1_i$ XOR $S2_i$ XOR $S3_i$ XOR $S4_i$ XOR $C_i$,  Eqn. 5

$L\_CARRY_{i+1} = (S4_i$ XOR $S1_i$ XOR $S2_i$ XOR $S3_i)$ && $C_i$ || $(S4_i$ XNOR $S1_i$ XNOR $S2_i$ XNOR $S3_i)$ && $S4_i$, and  Eqn. 6

$C_i = (S1_{i-1}$ XNOR $S2_{i-1})$ && $S1_{i-1}$ || $(S1_{i-1}$ XOR $S2_{i-1})$ && $S3_{i-1}$  Eqn. 7

These bitwise L_SUM and L_CARRY signals propagate through communication lines 313 and 314, respectively, into a second conventional adder 330 which produces the linear address "LIN_ADDR" propagating through communication lines 345.

Although the first embodiment of the generation unit reduces the critical path delays in producing the effective and linear addresses over the conventional generation unit of FIG. 1, it requires twice as much load on communication lines 301–303. Thus, the drivers of these inputs must be significantly larger to handle the larger load or the device must be designed in such a manner to conform with slower rise times during transitions of these signals. In essence, the benefit of a reduced critical time path is somewhat negated by the increased loading on the communication lines 301–303.

Moreover, this embodiment utilizes independent 3:2 and 4:2 CSAs 310 and 320. Since these CSAs include redundant logic, die area and device count are not reduced to their optimum area and number, respectively. Moreover, minimum power dissipation requirements are not exploited to their full potential.

Figure 4:
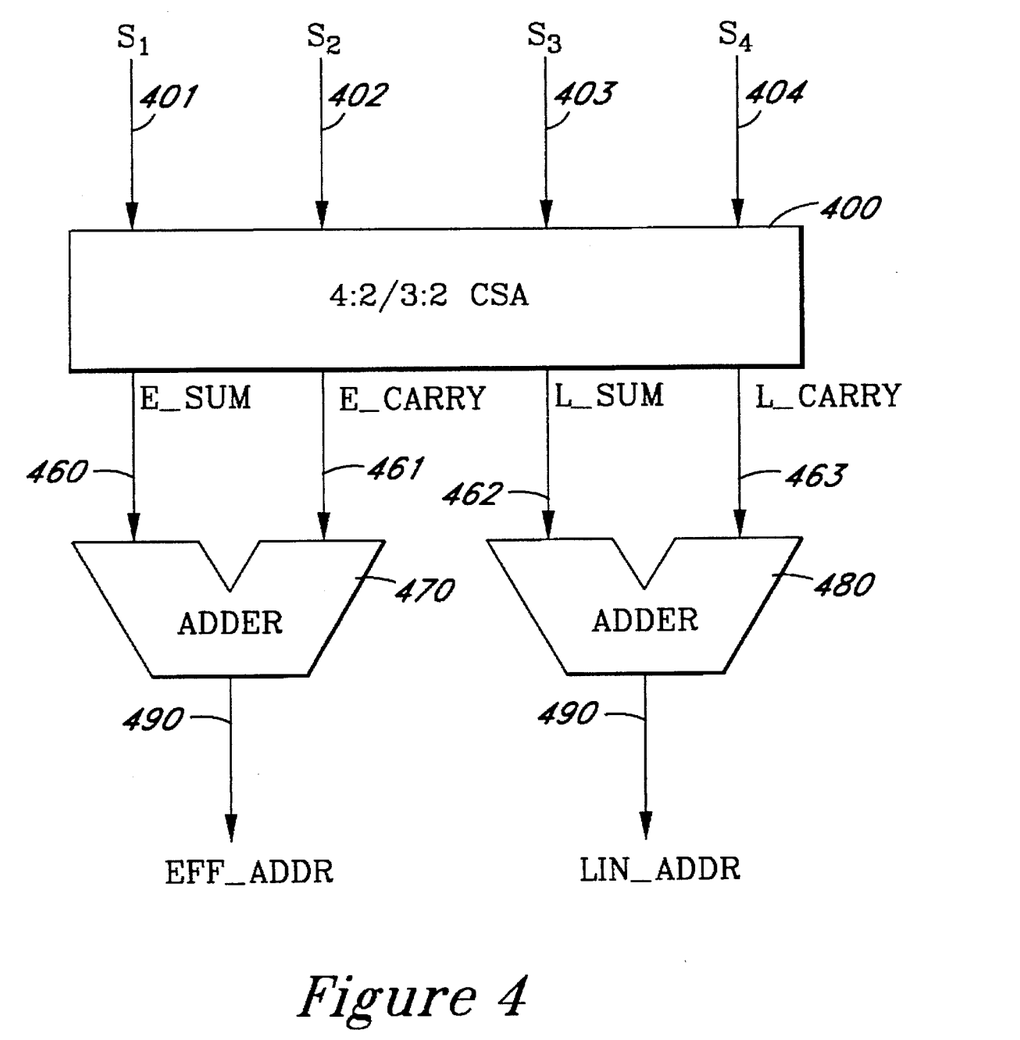
FIG. 4 is an illustrative embodiment of a combined CSA utilizing redundant logic within the independent CSAs of FIG. 3 in order to reduce total device count, die area layout, signal loading and propagation delays.

Referring to FIG. 4, a second embodiment of the generation unit which overcomes the disadvantages associated with the conventional architecture of FIG. 1 and those problems associated with the first embodiment of FIG. 3 is shown.

This generation unit comprises a 3:2/4:2 CSA ("combined CSA") 400 which is used as an addressing unit to produce an effective address "EFF_ADDR" and a linear address "LIN_ADDR".

As shown, the combined CSA 400 receives digital inputs S1, S2, S3 and S4 propagating through communication lines 401-404, respectively. As described in FIG. 1, these digital inputs typically are 32-bit double words, but any bit length may be used. The combined CSA 400 produces digital outputs E_SUM, E_CARRY, L_SUM and L_CARRY propagating through communication lines 460-463, respectively. The contents of these digital outputs are discussed above. The E_SUM and E_CARRY outputs are appropriately input into a first conventional adder 470 (e.g., carry propagate adder and the like) in order to produce EFF_ADDR propagating through signal lines 490. Similarly, the L_SUM and L_CARRY outputs are transferred into a second conventional adder 480 to produce LIN_ADDR propagating through communication lines 491.

Figure 5:
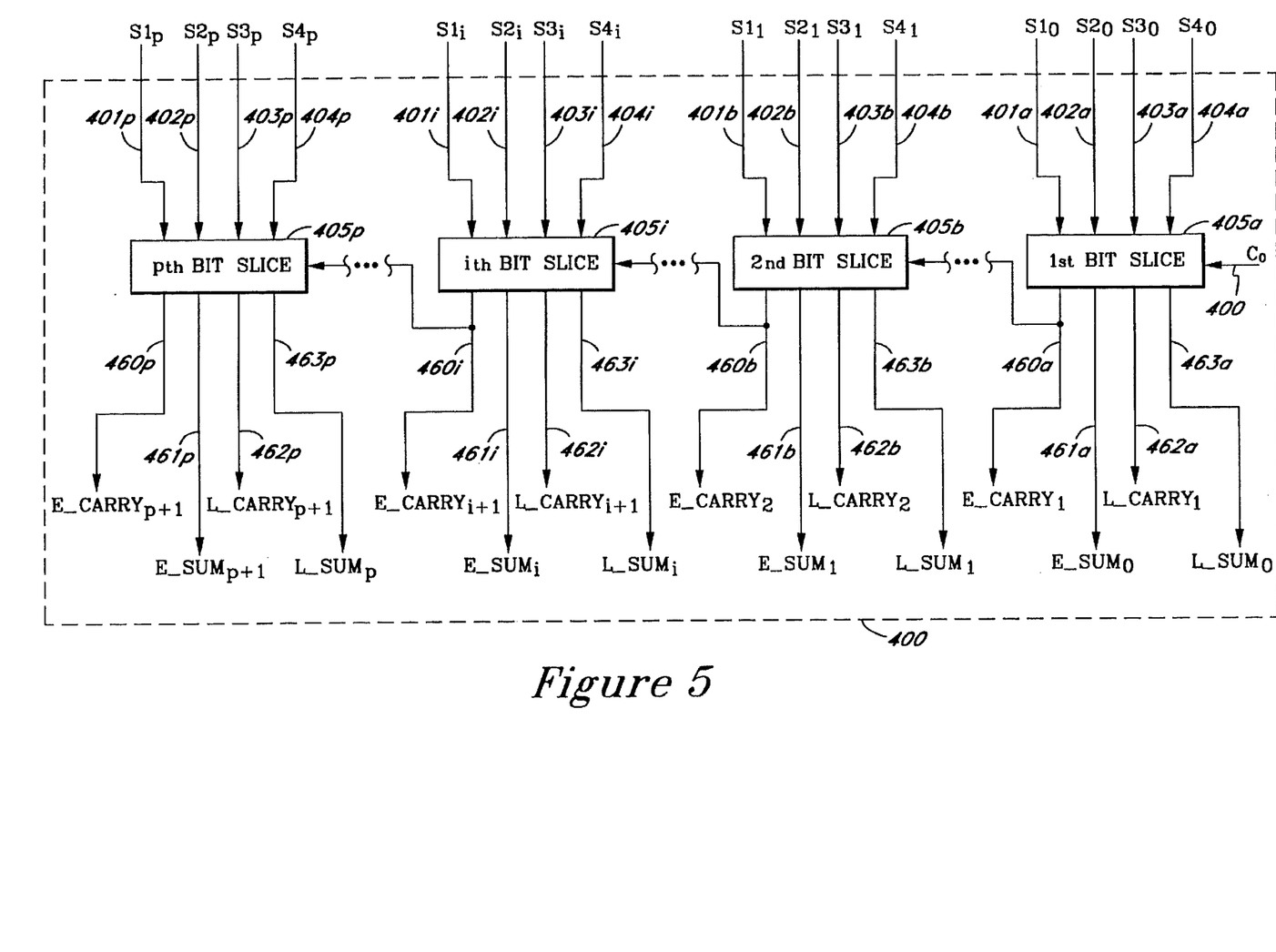
FIGS. 5 is an illustrative block diagram of individual bit slices employed within the combined CSA of FIG. 4.

Referring now to FIG. 5, the bit slice orientation of the combined CSA 400 is illustrated to support 32 bit data paths, although it is contemplated that 16, 64 or any other arbitrary bit width may be supported by the present invention. The combined CSA 400 includes "P" bit slices oriented in parallel with one another, where "P" is equal to "32" in this illustration. A first bit slice 405a receives "bit 0" of digital inputs S1-S4 as input through communication lines 401a-404a. The first bit slice 405a further receives a global carry "$C_0$" via communication line 406 which is used in calculating $L\_SUM_0$ and $L\_CARRY_1$ outputs propagating through communication lines 463a and 462a. The first bit slice 405a further produces the $E\_SUM_0$ and $E\_CARRY_1$ outputs propagating through communication lines 461a and 460a. The $E\_CARRY_1$ output is transferred as a global carry into an adjacent bit slice (i.e., a second bit slice 405b) to be used in calculating $L\_CARRY_2$ and $L\_SUM_2$ outputs transmitted through communication lines 462b and 463b. Each of these "P" bit slices 405a-405p calculate its corresponding E_CARRY, E_SUM, L_CARRY and L_SUM bitwise outputs in an identical manner.

Figure 6:
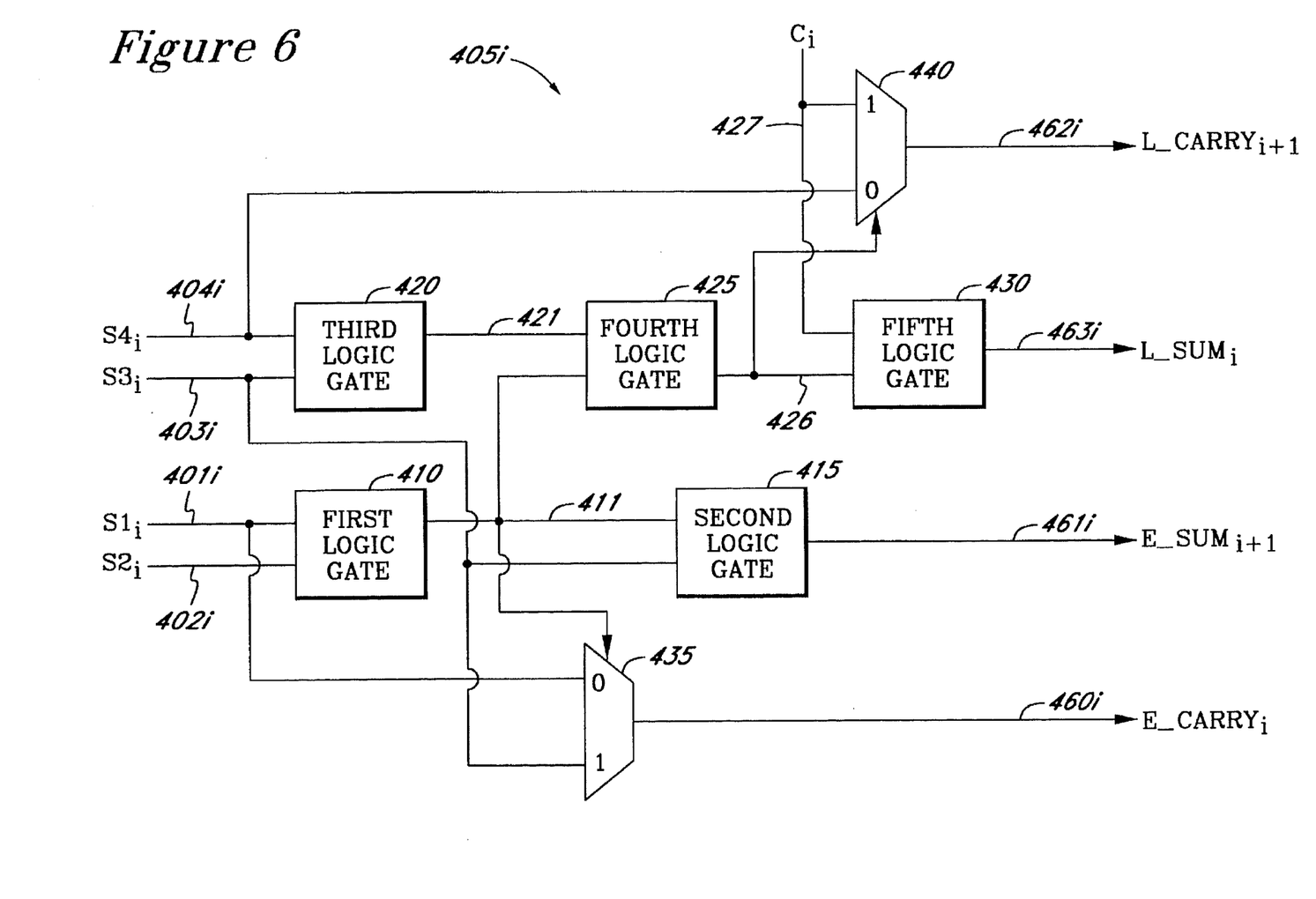
FIG. 6 is an illustrative circuit diagram of one bit slice of the combined CSA of FIG. 5.

Referring to FIG. 6, an illustrative embodiment of $i^{th}$ bit slice 405i is shown having four digital inputs $S1_i$, $S2_i$, $S3_i$ and $S4_i$ via communication lines $401_i$-$404_i$. Preferably, the $i^{th}$ bit slice 405i comprises a plurality of dual-input logic gates 410, 415, 420, 425 and 430, such as pass gates, XOR gates, multiplexers and the like which are configured to operate as XOR gates, and a pair of dual-input multiplexers 435 and 440. Collectively, these logic gates and multiplexers produce digital outputs $E\_SUM_i$, $E\_CARRY_i$, $L\_SUM_i$ and $L\_CARRY_i$.

As shown, the $S1_i$ input is transferred into a first input of a first multiplexer 435 and a first input of a first logic gate 410 through communication line $401_i$. The $S2_i$ input is transferred into a second input of the first logic gate 410 in order to produces a first logical sum ($S1_i$ XOR $S2_i$) through the communication line $402_i$. The first logic gate 410 outputs the first logical sum via communication line 411 as inputs to a second logic gate 415, a fourth logic gate 425 and as a select signal for a first multiplexer 435.

The $S3_i$ input is transferred into a second input of a third logic gate 420, a second input of the second logic gate 415 and a second input of the first multiplexer 435 via communication line $403_i$. The $S4_i$ input is transmitted into both a second input of a second multiplexer 440 and a first input of the third logic gate 420 via through communication line $404_i$. The combination of both $S3_i$ and $S4_i$ inputs produces a second logical sum ($S3_i$ XOR $S4_i$). Propagating along communication line 421, the second logical sum is input into a first input of the fourth logic gate 425 which produces a third logical sum ($S1_i$ XOR $S2_i$ XOR $S3_i$ XOR $S4_i$). The third logical sum propagates along communication line 426 which is used as a second input of a fifth logic gate and a select line of the second multiplexer 440. Finally, a carry signal from a previous i–1$^{th}$ bit slice ("$C_{i-1}$") is transmitted along a communication line 427 into a first input of the second multiplexer 440 and a first input of the fifth logic gate 430.

In view of the foregoing coupling, as shown in Table A, the following logical results are realized for the $E\_SUM_i$, $E\_CARRY_{i+1}$, $L\_SUM_i$ and $L\_CARRY_{i+1}$ signals.

TABLE A

| SIGNAL | Outputs of the Combined CSA LOGICAL VALUE |
|---|---|
| $E\_SUM_i$ | $S1_i$ XOR $S2_i$ XOR $S3_i$ |
| $E\_CARRY_{i+1}$ | ($S1_i$ XNOR $S2_i$) && $S1_i$ \|\| ($S1_i$ XOR $S2_i$) && $S3_i$ |
| $L\_SUM_i$ | $S1_i$ XOR $S2_i$ XOR $S3_i$ XOR $S4_i$ XOR $C_i$ |
| $L\_CARRY_{i+1}$ | ($S4_i$ XOR $S1_i$ XOR $S2_i$ XOR $S3_i$) && $C_i$ \|\| ($S4_i$ XNOR $S1_i$ XNOR $S2_i$ XNOR $S3_i$) && $S4_i$ |
| $C_i$ | ($S1_{i-1}$ XNOR $S2_{i-1}$) && $S1_{i-1}$ \|\| ($S1_{i-1}$ XOR $S2_{i-1}$) && $S3_{i-1}$ |

Although the first embodiment of the generation unit of FIG. 3 provides an acceptable solution to faster generation of the effective address and linear addresses to support faster processors, the benefits of the second embodiment of the generation unit exceed those of the first embodiment. For one reason, the device count of independent 3:2 CSA and the 4:2 CSAs is approximately 102 devices per bit while the combined CSA 400 of FIG. 4 is only 74 devices per bit producing an average savings of 28 devices per bit. For a generation unit supporting a 32 bit data path, a total savings of 898 devices can be realized.

Another reason is that this device count reduction allows die area to be reduced. For example, for an AGU employing two generation units, a reduction of the device count by 1,792 will reduce the overall area of the AGU by approximately 200 mils$^2$ if you assume a data path density of 0.075 mils$^2$ per device. Additionally, this device count reduction also reduces overall power consumption.

Another benefit afforded by the combined CSA is that loading on the four 32-bit communication lines 401-404 supporting the digital inputs to the generation unit is substantially reduced in comparison with the loading experienced by the independent 3:2 and 4:2 CSAs. This is accomplished by removing extra routing of the communication lines 301-303 of FIG. 3 and by lessening the loading caused by redundant gates. This reduced loading has an effect of reducing the overall critical path delay to produce the linear address because the digital inputs to the combined CSA are able to transition faster by not experiencing loading effects.

The present invention described herein may be designed in many different embodiments evident to one skilled in the art than those described without departing from the spirit and scope of the present invention. For example, although non-inverting standard TTL logic gates have been set forth, it is contemplated that inverting standard TTL logic gates may be employed. Moreover, CMOS and/or BiCMOS technology may be used in the CSAs rather than standard TTL logic. The invention should, therefore be measured in terms of the claims which follow.

What is claimed is:

1. An integrated circuit device performing arithmetic operations on a plurality of inputs including a base address, a scaled index, a displacement and a segment base to produce an effective address and a linear address, comprising:

a combined carry-save adder including a plurality of bit slice circuits oriented in parallel, each of the plurality of bit slice circuits produces (i) at least one output signal of a first group of output signals in order to calculate at least one bit of the effective address, and (ii) at least one output signal of a second group of output signals in order to calculate at least one bit of the linear address;

a first adder circuit coupled to the combined carry-save adder, said first adder circuit produces the effective address; and a second adder circuit coupled to the combined carry-save adder, said second adder circuit produces the linear address.

2. The integrated circuit device according to claim 1, wherein said at least one output signal of said first group includes a sum ("E_SUM$_i$") signal and a carry ("E_CARRY$_i$") signal.

3. The integrated circuit device according to claim 2, wherein said at least one output signal of said second group includes a sum ("L_SUM$_i$") signal and a carry ("L_CARRY$_{i+1}$") signal.

4. The integrated circuit device according to claim 2, wherein each of said plurality of bit slice circuits includes a plurality of logic gates coupled together to produce the E_SUM$_i$ signal by exclusively OR'ing predetermined bits of said base address, said scaled index and said displacement.

5. The integrated circuit device according to claim 4, wherein said plurality of logic gates further produce said E_CARRY$_{i+1}$ signal by a bitwise OR'ing (i) a first product term equal to said predetermined bit of said base address bitwise AND'ed with said predetermined bit of said base address exclusively NOR'ed with said predetermined bit of said scaled index, and (ii) a second product term equal to said predetermined bit of said displacement bitwise AND'ed with said predetermined bit of said base address exclusively OR'ed with said predetermined bit of said scaled index.

6. The integrated circuit device according to claim 3, wherein each of said plurality of bit slice circuits includes a plurality of logic gates coupled together to produce said L_SUM$_i$ signal being exclusively OR'ing predetermined bits of said base address, said scaled index, said displacement, and said segment base with a carry signal.

7. The integrated circuit device according to claim 6, wherein said plurality of logic gates further produce said L_CARRY$_{i+1}$ signal by a bitwise OR'ing (i) a first product term equal to said carry signal bitwise AND'ed with said predetermined bit of said base address exclusively OR'ed with said predetermined bits associated with each of said scaled index, said displacement and said segment base, with (ii) a second product term equal to said predetermined bit of said segment base bitwise AND'ed with said predetermined bit of said base address exclusively NOR'ed with said predetermined bits associated with each of said scaled index, said displacement and said segment base.

8. An integrated circuit device performing arithmetic operations on a plurality of inputs including a base address, a scaled index, a displacement and a segment base, the integrated circuit device comprising:

logic means for performing logical operations on the plurality of digital inputs to produce a first group of output signals and a second group of output signals, said logic means including a plurality of bit slice circuits each of which capable of producing (i) at least one output signal of the first group of output signals, and (ii) at least one output signal of the second group of output signals;

first adder means for performing a first set of arithmetic operations on said first group of output signals in order to produce an effective address, said first adder means being coupled to said logic means; and second adder means for performing a second set of arithmetic operations on said second group of output signals in parallel with said first set of arithmetic operations in order to produce a linear address, said second adder means being coupled to said logic means.

9. The integrated circuit device according to claim 8, wherein each of the plurality of bit slice circuits producing at least a sum ("E_SUM$_i$") signal and a carry ("E_CARRY$_i$") signal.

10. The integrated circuit device according to claim 9, wherein each of the plurality of bit slice circuits producing a sum ("L_SUM$_i$") signal and a carry ("L_CARRY$_{i+1}$") signal of the second group of output signals.

11. The integrated circuit device according to claim 10, wherein each of said plurality of bit slice circuits including a plurality of logic gates coupled together to produce said L_SUM$_i$ signal being exclusively OR'ing predetermined bits of said base address, said scaled index, said displacement, and said segment base with a carry signal.

12. The integrated circuit device according to claim 11, wherein said plurality of logic gates further produce said L_CARRY$_{i+1}$ signal by a bitwise OR'ing (i) a first product term equal to said carry signal bitwise AND'ed with said predetermined bit of said base address exclusively OR'ed with said predetermined bits associated with each of said scaled index, said displacement and said segment base and (ii) a second product term equal to said predetermined bit of said segment base bitwise AND'ed with said predetermined bit of said base address exclusively NOR'ed with said predetermined bits associated with each of said scaled index, said displacement and said segment base.

13. The integrated circuit device according to claim 9, wherein each of said plurality of bit slice circuits including a plurality of logic gates coupled together to produce the E_SUM$_i$ signal by exclusively OR'ing predetermined bits of said base address, said scaled index and said displacement.

14. The integrated circuit device according to claim 13, wherein said plurality of logic gates further produce said E_CARRY$_{i+1}$ signal being a bitwise OR'ing of (i) a first product term equal to said predetermined bit of said base address bitwise AND'ed with said predetermined bit of said base address exclusively NOR'ed with said predetermined bit of said scaled index, and a (ii) second product term equal to said predetermined bit of said displacement bitwise AND'ed with said predetermined bit of said base address exclusively NOR'ed with said predetermined bit of said scaled index.

15. A computer system comprising:

memory means for storing a plurality of digital inputs including a base address, a scaled index, a displacement and a segment base;

means for processing said plurality of digital inputs, said processing means including an integrated circuit device performing arithmetic operations on said plurality of digital inputs, said integrated circuit device including logic means for performing logical operations on the plurality of digital inputs to produce a first group of output signals and a second group of output signals, said logic means including a plurality of bit slice circuits and capable of producing at least one signal of said first group of output signals in order to calculate one bit of the effective address, and at least one output signal of said second group of output signals in order to calculate one bit of the linear address, first adder means for performing a first set of arithmetic operations on said first group of output signals in order to produce an effective address, said first adder means being coupled to said logic means, and second adder means for performing a second set of arithmetic operations on said second group of output signals in parallel with said first set of arithmetic operations in order to produce a linear address, said second adder means being coupled to said logic means; and bus means for enabling communication between said memory means and said processing means.

16. The computer system according to claim 15, wherein said plurality of bit slice circuits being oriented in parallel.

17. The computer system according to claim 15, wherein said at least one output signal of with said first group includes a sum ("E_SUM$_i$") signal and a carry ("E_CARRY$_i$") signal.

18. The computer system according to claim 17, wherein said at least one output signal of said second group includes a sum ("L_SUM$_i$") signal and a carry ("L_CARRY$_{i+1}$") signal.

19. The computer system according to claim 18, wherein each of said plurality of bit slice circuits includes a plurality of logic gates coupled together to produce said L_SUM$_i$ signal by exclusively OR'ing predetermined bits of said base address, said scaled index, said displacement, and said segment base with one of said plurality of carry signals.

20. The computer system according to claim 19, wherein said plurality of logic gates further produce said L_CARRY$_{1+1}$ signal by a bitwise OR'ing (i) a first product term equal to said one of said carry signals bitwise AND'ed with said predetermined bit of said base address exclusively OR'ed with said predetermined bits associated with each of said scaled index, said displacement and said segment base and (ii) a second product term equal to said predetermined bit of said segment base bitwise AND'ed with said predetermined bit of said base address exclusively NOR'ed with said predetermined bits associated with each of said scaled index, said displacement and said segment base.

21. The computer system according to claim 17, wherein each of said plurality of bit slice circuits includes a plurality of logic gates coupled together to produce said E_SUM$_i$ signal by exclusively OR'ing predetermined bits of said base address, said scaled index and said displacement.

22. The computer system according to claim 21, wherein said plurality of logic gates further produces said E_CARRY$_{i+1}$ signal by bitwise OR'ing (i) a first product term equal to said predetermined bit of said base address bitwise AND'ed with said predetermined bit of said base address exclusively NOR'ed with said predetermined bit of said scaled index, and (ii) a second product term equal to said predetermined bit of said displacement bitwise AND'ed with said predetermined bit of said base address exclusively OR'ed with said predetermined bit of said scaled index.

23. A method for producing an effective address having a first plurality of bits and a linear address having the first plurality of bits in parallel, the method comprising the steps of:

receiving a second plurality of digital inputs including a base address, a scaled index, a displacement and a segment base;

producing a first plurality of bitwise effective sum signals by logically exclusive OR'ing identically ordered bits of said base address, said scaled index and said displacement;

producing a first plurality of bitwise effective carry signals by performing logical operations on said base address, said scaled index and said displacement;

producing a first plurality of bitwise linear sum signals by logically exclusive OR'ing identically ordered bits of said base address, said scaled index, said displacement, said base address and a prior-ordered carry signal, said first plurality of bitwise linear sum signals are produced concurrently with said first plurality of bitwise effective sum signals;

producing first plurality of bitwise linear carry signals by performing logical operations on said base address, said scaled index, said displacement and said segment base;

producing the effective address by summing said first plurality of bitwise effective sum signals with said first plurality of bitwise effective carry signals; and producing the linear address by summing said first plurality of bitwise linear sum signals with said first plurality of bitwise linear carry signals.

24. A computer system comprising:

a bus;

a memory subsystem coupled to said bus; and a processor coupled to the bus, said processor including an integrated circuit device performing arithmetic operations on a plurality of inputs to produce an effective address and a linear address, the integrated circuit device including a combined carry-save adder including a plurality of bit slice circuits oriented in parallel, each of the plurality of bit slice circuits produces (i) at least one output signal of a first group of output signals in order to calculate at least one bit of the effective address, and (ii) at least one output signal of a second group of output signals in order to calculate at least one bit of the linear address, a first adder circuit coupled to the combined carry-save adder, said first adder circuit produces the effective address, and a second adder circuit coupled to the combined carry-save adder, said second adder circuit produces the linear address.

25. The computer system according to claim 24, wherein the plurality of inputs into the integrated circuit device include a base address, a scaled index, a displacement and a segment address.

26. The computer system according to claim 25, wherein said at least one output signal of said first group includes a sum ("E_SUM$_i$") signal and a carry ("E_CARRY$_i$") signal.

27. The computer system according to claim 26, wherein each of said plurality of bit slice circuits includes a plurality of logic gates coupled together to produce the E_SUM$_i$ signal by exclusively OR'ing predetermined bits of said base address, said scaled index and said displacement.

28. The computer system according to claim 27, wherein said plurality of logic gates further precludes said E_CARRY$_{i+1}$ signal being a bitwise OR'ing of (i) a first product term equal to said predetermined bit of said base address bitwise ADD'ed with said predetermined bit of said base address exclusively NOR'ed with said predetermined bit of said scaled index, and (ii) a second product term equal to said predetermined bit of said displacement bitwise ADD'ed with said predetermined bit of said base address exclusively OR'ed with said predetermined bit of said scaled index.

29. The computer system according to claim 25, wherein said at least one output signal of said second group includes a sum ("L_SUM$_i$") signal and a carry ("L_CARRY$_{i+1}$") signal.

30. The computer system according to claim 29, wherein each of said plurality of bit slice circuits includes a plurality of logic gates coupled together to produce said L_SUM$_i$ signal being exclusively OR'ing predetermined bits of said base address, said scaled index, said displacement, and said segment base with a carry signal.

31. The computer system according to claim 30, wherein said plurality of logic gates further produce said L_CARRY$_{i+1}$ signal by bitwise OR'ing (i) a first product term equal to said carry signal bitwise ADD'ed with said predetermined bit of said base address exclusively OR'ed with said predetermined bits associated with each of said scaled index, said displacement and said segment base, and (ii) a second product term equal to said predetermined bit of said segment base bitwise ADD'ed with said predetermined bit of said base address exclusively NOR'ed with said predetermined bits associated with each of said scaled index, said displacement and said segment base.

* * * * *

UNITED STATES PATENT AND TRADEMARK OFFICE
CERTIFICATE OF CORRECTION

PATENT NO. : 5,625,582
DATED : April 29, 1997
INVENTOR(S) : Mark A. Timko

It is certified that error appears in the above-indentified patent and that said Letters Patent is hereby corrected as shown below:

In column 1 at line 40 delete "LIN_ADDR-S4" and insert "LIN_ADDR=S4--

In column 9 at line 36 delete "L_CARRY$_{1+1}$" and insert --L_CARRY$_{i+1}$--

Signed and Sealed this

Thirtieth Day of September, 1997

Attest:

BRUCE LEHMAN

Attesting Officer      Commissioner of Patents and Trademarks